US009127811B2

(12) United States Patent
Vickio, Jr.

(10) Patent No.: US 9,127,811 B2
(45) Date of Patent: Sep. 8, 2015

(54) HYDRAULIC ACCUMULATOR

(71) Applicant: Louis P. Vickio, Jr., Houston, TX (US)

(72) Inventor: Louis P. Vickio, Jr., Houston, TX (US)

( * ) Notice: Subject to any disclaimer, the term of this patent is extended or adjusted under 35 U.S.C. 154(b) by 217 days.

(21) Appl. No.: 13/910,199

(22) Filed: Jun. 5, 2013

(65) Prior Publication Data

US 2014/0360608 A1 Dec. 11, 2014

(51) Int. Cl.
*F16L 55/04* (2006.01)
*F17C 1/00* (2006.01)
*F15B 1/16* (2006.01)

(52) U.S. Cl.
CPC . *F17C 1/00* (2013.01); *F15B 1/165* (2013.01); *F15B 2201/205* (2013.01); *F15B 2201/3152* (2013.01); *F15B 2201/3156* (2013.01); *F15B 2201/4053* (2013.01)

(58) Field of Classification Search
CPC .................................. F15B 1/04; B29C 70/08
USPC ............................... 138/26, 30; 220/590, 589
See application file for complete search history.

(56) References Cited

U.S. PATENT DOCUMENTS 2,561,957 A 7/1951 Teague, Jr.
2,563,257 A 8/1951 Loukonen
3,047,191 A * 7/1962 Young ........................... 220/588
3,149,645 A 9/1964 Broadwell
3,319,420 A 5/1967 Mercier
3,744,527 A 7/1973 Mercier
3,822,725 A 7/1974 Zirps
4,449,552 A 5/1984 Porel
4,520,840 A 6/1985 Michel
4,587,074 A 5/1986 De Loof
4,714,094 A 12/1987 Tovagliaro
4,778,073 A * 10/1988 Ehs ............................... 220/590
4,936,383 A * 6/1990 Towner et al. .................. 166/68
5,025,943 A * 6/1991 Forsman ....................... 220/589
5,368,073 A 11/1994 Murphy
5,758,796 A * 6/1998 Nishimura et al. ........... 220/590
5,798,156 A 8/1998 Mitlitsky et al.
5,860,452 A * 1/1999 Ellis ................................ 138/30

(Continued)

FOREIGN PATENT DOCUMENTS

WO WO2007114681 10/2007
WO WO2012150137 11/2012
WO WO2013026521 2/2013

OTHER PUBLICATIONS

Shen, Frank C., "A filament-wound structure technology overview" Materials Chemistry and Physics 1995.

(Continued)

*Primary Examiner* — Patrick F Brinson
(74) *Attorney, Agent, or Firm* — John R. Casperson

(57) ABSTRACT

A hydraulic accumulator comprises a pressure shell, a bladder, and a rod. The pressure shell is filament wound around a leak proof barrier/mold. The bladder is tubular and carried by the rod. The rod extends though the pressure shell and seals to the ends of the shell. The shell has generally frustoconical sections connecting the ends of the shell to mid section. The bladder is tubular and expandable. A first chamber having an annular cross section for gas is formed between the rod and the bladder. A second chamber having an annular cross section for liquid is formed between the bladder and the shell. A first flow passage is formed through an end seal means communicating with the first chamber. A second flow passage is formed though an end seal means communicating with the second chamber.

10 Claims, 2 Drawing Sheets

(56) References Cited

U.S. PATENT DOCUMENTS

| | | | | |
|---|---|---|---|---|
| 5,875,648 | A * | 3/1999 | Boye et al. | 62/480 |
| 7,108,015 | B2 | 9/2006 | Lombart et al. | |
| 7,108,016 | B2 | 9/2006 | Moskalik et al. | |
| 7,219,812 | B2 | 5/2007 | Debecker et al. | |
| 7,556,064 | B2 * | 7/2009 | Tyler et al. | 138/30 |
| 7,803,241 | B2 | 9/2010 | Cundiff et al. | |
| 8,308,017 | B2 * | 11/2012 | Schlag | 220/588 |
| 8,464,893 | B2 * | 6/2013 | Iida et al. | 220/590 |
| 8,517,206 | B2 * | 8/2013 | Liu | 220/590 |
| 2005/0040253 | A1 | 2/2005 | Thornton | |
| 2005/0194054 | A1 | 9/2005 | Moskalik et al. | |
| 2010/0084033 | A1 * | 4/2010 | Hummelt | 138/30 |
| 2010/0237081 | A1 * | 9/2010 | Lindner | 220/589 |

OTHER PUBLICATIONS

Lincoln Composites "Tuffshell(R) Accumulators Overview" http://lincolncomposites.com/products/tuffshell-accumulators/ Mar. 17, 2013.

* cited by examiner

HYDRAULIC ACCUMULATOR

FIELD OF THE INVENTION

One aspect of the invention relates to pressure shells. Another aspect of the invention relates to hydraulic accumulators. Further aspects relate to improvements for hydraulic accumulators.

BACKGROUND OF THE INVENTION

Hydraulic accumulators provide a reservoir of pressurized liquid to enable a hydraulic system to cope with fluid demands with a minimally sized pump. Hydraulic accumulators also reduce or eliminate fluid pulsations in a hydraulic system.

OBJECTS OF THE INVENTION

It is an object of this invention to provide the least number of accumulators necessary to provide needed hydraulic power where space is at a premium, such as on an offshore drilling platform.

It is another object of this invention to provide a single hydraulic accumulator that can replace or be used instead of multiple conventional accumulators.

It is a further object of this invention to provide a hydraulic accumulator that is resistant to salt water damage.

It is another object of this invention to provide a hydraulic accumulator that is light in weight.

SUMMARY OF THE INVENTION

A first embodiment of the invention provides a filament wound pressure shell. The shell is defined by a generally annular sidewall. The shell has a first end, a second end opposite from the first end, and a longitudinal axis extending between the first end and the second end. The sidewall is generally symmetrical around the longitudinal axis. The sidewall has a first generally cylindrical section positioned at the first end and defining a shell first end opening. A second generally cylindrical section positioned at the second end and defines a shell second end opening. A third generally cylindrical mid section is positioned between the first end and the second end. The mid section has a larger inside diameter than the first end section and the second end section. A first generally frustoconical section connects the first end section to the mid section and a second generally frustoconical section connects the second end section to the mid section. The generally cylindrical sections have generally cylindrical inside and outside surfaces, and the generally frustoconical sections having generally frustoconical inside and outside surfaces.

The just described pressure shell can be used in a hydraulic accumulator. For such an application, a bladder is positioned in the hollow pressure shell. The bladder can be charged with gas to bring liquids positioned in the volume between the bladder and the shell to above needed pressure. The liquids can then be regulated down to desired pressure after withdrawal.

Another embodiment of the invention provides an improved bladder assembly for a hydraulic accumulator of the general structure described above, wherein there is a hollow pressure shell having a first end, a second end, and a longitudinal axis, and a bladder positioned in the hollow pressure shell. For the improvement, a rod is positioned along the axis of the hollow pressure shell from the first end to the second end. The rod carries the bladder annularly along its length. The bladder is sealingly attached to the rod and the rod is sealingly connected to the pressure shell at the first end and the second end. The rod defines a flow passage from an outside of the pressure shell to an inside of the bladder.

The structure permits the bladder to be inserted or withdrawn from the pressure shell as an assembly with the rod. The rod also helps to locate the bladder within the shell.

A further embodiment of the invention provides a hydraulic accumulator. The accumulator comprises a pressure shell, a bladder, and a rod.

The shell is defined by a generally annular sidewall. The shell has a first end, a second end opposite from the first end, and a longitudinal axis extending between the first end and the second end. The sidewall is generally symmetrical around the longitudinal axis. The sidewall has a first generally cylindrical section positioned at the first end and defining a shell first end opening. A second generally cylindrical section positioned at the second end and defines a shell second end opening. A third generally cylindrical mid section is positioned between the first end and the second end. The mid section has a larger inside diameter than the first end section and the second end section and has a first end and a second end. A first generally frustoconical section connects the first end section to the first end of the mid section and a second generally frustoconical section connects the second end section to the second end of the mid section. The generally cylindrical sections have generally cylindrical inside and outside surfaces, and the generally frustoconical sections having generally frustoconical inside and outside surfaces.

The rod is positioned axially in the hollow pressure shell. The rod has a first end and a second end and carries a first end seal means on its first end for sealing the first end of the shell and a second end seal means on its second end for sealing the second end of the shell.

The bladder is tubular and expandable. It has a first end and a second end and is mounted around the rod. The bladder extends from near the first end of the shell to near the second end of the shell. The first end of the bladder is sealingly attached to the rod near the first end seal means and the second end of the bladder is sealingly attached to the rod near the second end seal means.

A first chamber having an annular cross section for gas is formed between the rod and the bladder. A second chamber having an annular cross section for liquid is formed between the bladder and the shell. A first flow passage is formed through an end seal means communicating with the first chamber. A second flow passage is formed though an end seal means communicating with the second chamber.

DETAILED DESCRIPTION OF THE INVENTION

Figure 1:
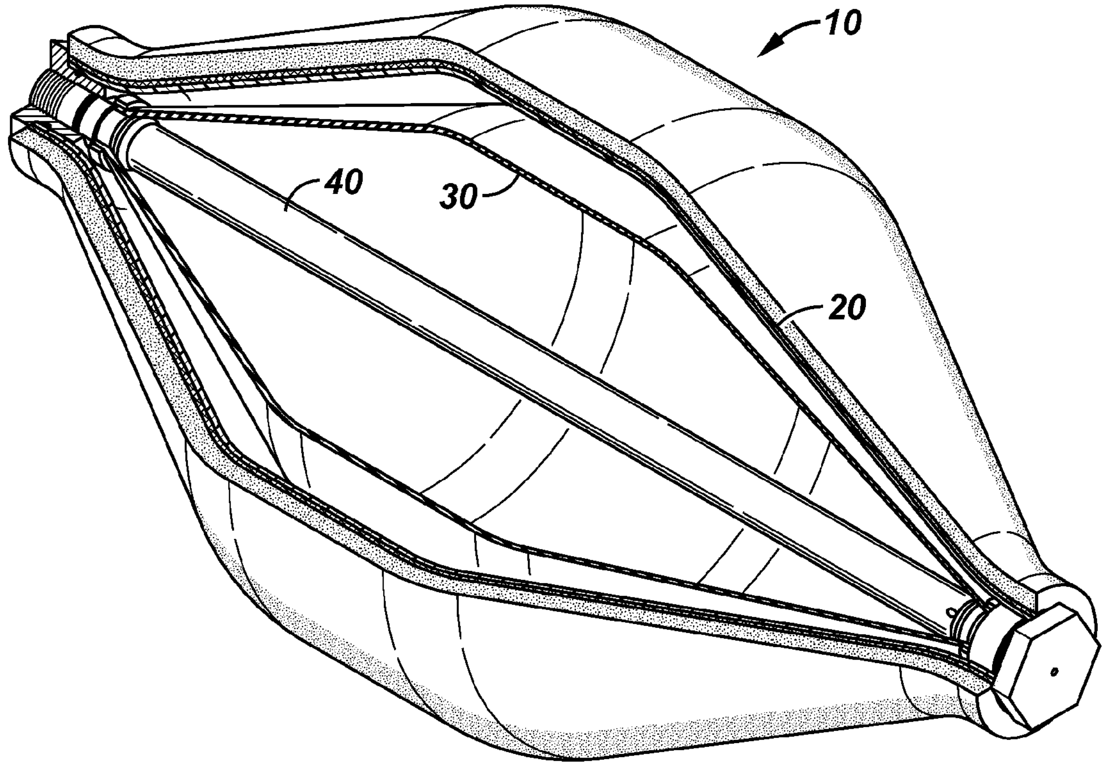
FIG. 1 is a pictorial illustration on one embodiment of the invention, taken partly in longitudinal section to show external and internal construction details.
Figure 2:
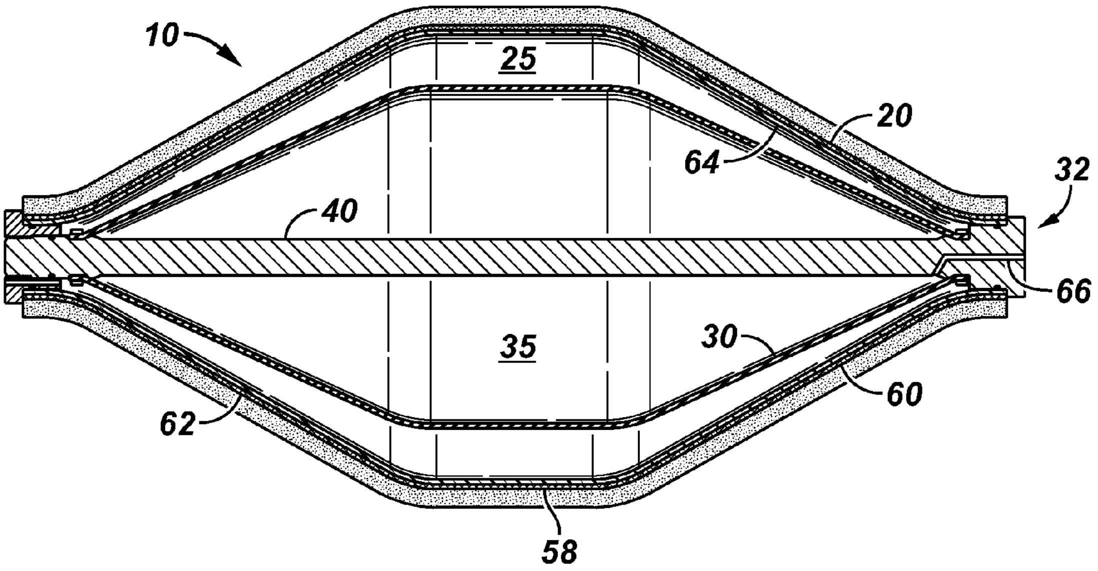
FIG. 2 is a full longitudinal view of the embodiment of the invention shown in FIG. 1, at a slightly smaller scale.
Figure 3:
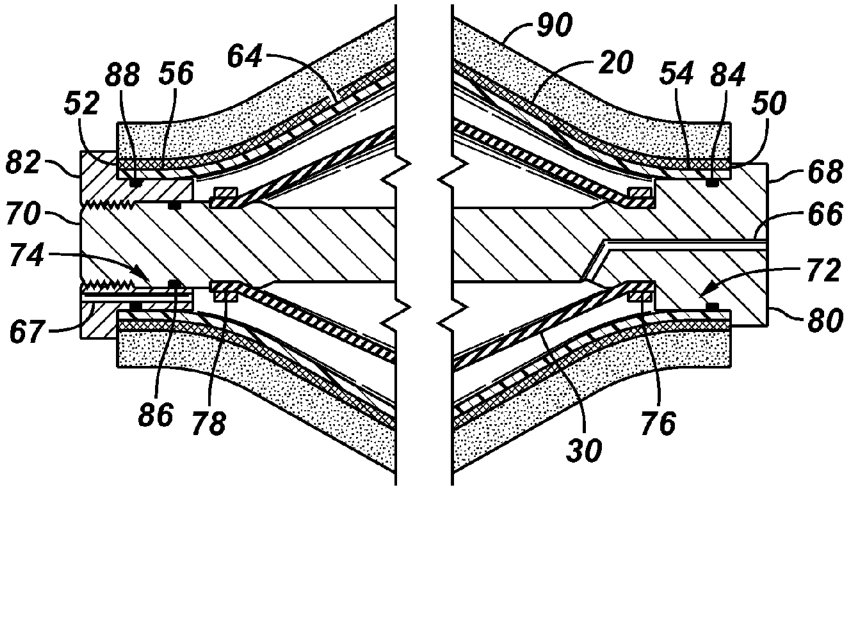
FIG. 3 is a broken view of the embodiment of the invention shown in FIG. 2, magnified to show construction details.

A first embodiment of the invention provides a filament wound pressure shell 20. The shell is defined by a generally annular sidewall. The shell has a first end 50, a second end 52 opposite from the first end, and a longitudinal axis extending between the first end and the second end. The sidewall is generally symmetrical around the longitudinal axis. The sidewall has a first generally cylindrical section 54 positioned at the first end and defining a shell first end opening. A second generally cylindrical section 56 positioned at the second end and defines a shell second end opening. A third generally cylindrical mid section 58 is positioned between the first end and the second end. The mid section has a larger inside diameter than the first end section and the second end section. A first generally frustoconical section 60 connects the first end section to the mid section and a second generally frustoconical section 62 connects the second end section to the mid section. The generally cylindrical sections have generally cylindrical inside and outside surfaces, and the generally frustoconical sections having generally frustoconical inside and outside surfaces.

In a preferred embodiment, a liner 64 is positioned adjacent to the inside surface of the shell. Plastic is a suitable material for forming the liner. The liner is positioned by winding the filaments over its outer surface, which serves as a mold or mandrel. High tensile strength filament windings are preferred, such as S-2 glass fiber, polyaramid fiber, carbon fiber, or basalt fiber and the filament windings are impregnated with thermoset resin and cured. Most preferably, the pressure shell is constructed of carbon fiber filament windings in a continuous epoxy matrix and the plastic liner is a polytetrafluoroethylene.

The just described pressure shell 20 can be used in a hydraulic accumulator 10. For such an application, a bladder 30 having an inside volume 35 is positioned in the hollow pressure shell. The bladder can be charged with gas to bring liquids positioned in the volume 25 between the bladder and the shell to above needed pressure. The liquids can then be regulated down to desired pressure after withdrawal.

Another embodiment of the invention provides an improved bladder assembly 32 for a hydraulic accumulator of the general structure described above, wherein there is a hollow pressure shell having a first end, a second end, and a longitudinal axis, and a bladder positioned in the hollow pressure shell. For the improvement, a rod 40 is positioned along the axis of the hollow pressure shell from the first end to the second end. The rod carries the bladder annularly along its length. The bladder is sealingly attached to the rod and the rod is sealingly connected to the pressure shell at the first end and the second end. The rod defines a flow passage 66 from an outside of the pressure shell to an inside of the bladder.

In a preferred embodiment of the invention, the bladder is tubular and has open ends which are sealingly attached to the rod. For assembly, the depressurized bladder and rod are slid into the pressure vessel as a unit.

A further embodiment of the invention provides a hydraulic accumulator 10. The accumulator comprises a pressure shell 20, a bladder 30, and a rod 40.

The shell is defined by a generally annular sidewall. The shell has a first end, a second end opposite from the first end, and a longitudinal axis extending between the first end and the second end. The sidewall is generally symmetrical around the longitudinal axis. The sidewall has a first generally cylindrical section positioned at the first end and defining a shell first end opening. A second generally cylindrical section positioned at the second end and defines a shell second end opening. A third generally cylindrical mid section is positioned between the first end and the second end. The mid section has a larger inside diameter than the first end section and the second end section. A first generally frustoconical section connects the first end section to the mid section and a second generally frustoconical section connects the second end section to the mid section. The generally cylindrical sections have generally cylindrical inside and outside surfaces, and the generally frustoconical sections having generally frustoconical inside and outside surfaces. The shell is preferably constructed of filament windings embedded in a continuous plastic matrix. A liner is preferably positioned adjacent to the inside surface of the shell.

The rod 40 is positioned axially in the hollow pressure shell 20. The rod has a first end 68 and a second end 70 and carries a first end seal means 72 on its first end for sealing the first end of the shell and a second end seal means 74 on its second end for sealing the second end of the shell.

The bladder 30 is tubular and expandable. It has a first end 76 and a second end 78 and is mounted around the rod. The bladder extends from near the first end of the shell to near the second end of the shell. The first end of the bladder is sealingly attached to the rod near the first end seal means and the second end of the bladder is sealingly attached to the rod near the second end seal means.

A first chamber 35 having an annular cross section for gas is formed between the rod and the bladder. A second chamber 25 having an annular cross section for liquid is formed between the bladder and the shell. A first flow passage 66 is formed through an end seal means communicating with the first chamber. A second flow passage 67 is formed though an end seal means communicating with the second chamber. The flow passages could be formed through the same end seal if desired. Preferably, and as illustrated, they establish communication from opposite ends.

In the illustrated embodiment, the rod has a head 80 at the first end that forms an element of the first end seal for the shell and a threaded second end, a nut 82 being positioned on the threaded second end forming an element of the second end seal for the shell.

In a preferred embodiment of the invention, a first annular seal 84 is positioned between a generally cylindrical portion of the bolt head and the generally cylindrical inside surface at the first end of the shell. A second annular seal 86 is positioned between a generally cylindrical portion of the bolt adjacent the threaded end section and a generally cylindrical inside portion of the nut, and a third annular seal 88 is positioned between a generally cylindrical outer surface of the nut and the generally cylindrical inside surface at the second end of the shell.

In further preferred embodiments of the invention, the annular seals are O-rings and the O-rings are positioned in annular grooves formed in generally cylindrical outside surfaces, the shell has curved transitional sections at the ends of the frustoconical sections, and a protective coating 90 is provided on an outer surface of the shell. Polyurethane foam is suitable.

For integrity, annular bands can be used to secure the first and second ends of the bladder to the rod, and the end of the bladder can be positioned in annular recesses in the rod.

For more extreme service, the liner can be constructed of metal, and metal-to-metal seals can be used.

The invention is further illustrated by the following example.

Specific Example

An exemplary accumulator for offshore oil platforms would have a diameter of 24 inches. Because of high operating pressures, a steel accumulator of this size would have a very thick sidewall that would make it impractical. The carbon fiber filament wound shell would only have a thickness of about ½ inch.

The carbon fiber is wound under tension over a plastic shell that acts as a mold during manufacture, and as a liner after the wrap has been permitted to dry. The fiber is impregnated with a plastic such as thermoset epoxy resin. The liner is constructed of a plastic composite with good high temperature properties, such as PTFE.

The shaft will have the bladder installed. It will be inserted into the shell assembly and the end nut will be screwed onto the shaft.

The bladder will then be filled with nitrogen to a predetermined pressure, for example, 2,900 psi. Then the fluid will be pumped in the nut end. This will be pumped to a predetermined pressure, for example, 5,000 psi.

The accumulator will be hooked up to a pressure control valve controlling pressure to, for example, 3,000 psi.

Now, fluid can be used until pressure comes down from 5,000 psi to 3,000 psi.

A single inventive accumulator will replace many 10 gallon accumulators which are currently used.

While certain preferred embodiments have been described herein, the invention is not to be construed as being so limited, except to the extent that such limitations are found in the claims.

What is claimed is:

1. A hydraulic accumulator comprising a hollow pressure shell defined by a generally annular sidewall, said shell having a first end, a second end, and a longitudinal axis extending between the first end and the second end, said sidewall being generally symmetrical around the longitudinal axis, said first end being opposite from the second end, said sidewall having a first generally cylindrical section positioned at the first end and defining a shell first end opening, a second generally cylindrical section positioned at the second end and defining a shell second end opening, and a third generally cylindrical mid section positioned between the first end and the second end, said mid section having a larger inside diameter than the first end section and the second end section, a first generally frustoconical section connecting the first end section to the mid section, and a second frustoconical section connecting the second end section to the mid section, said generally cylindrical sections having generally cylindrical inside and outside surfaces, and said generally frustoconical sections having generally frustoconical inside and outside surfaces, a rod positioned axially in the hollow pressure shell, said rod having a first end and a second end, a first end seal carried by the rod near the first end of the rod sealing the first end of the shell, a second end seal carried by the rod sealing the second end of the shell, a tubular expandable bladder having a first end and a second end mounted around the rod and extending from near the first end of the shell to near the second end of the shell, the first end of the bladder being sealingly attached to the rod near first end seal, the second end of the bladder being sealingly attached to the rod near the second end seal, a first chamber having an annular cross section for gas being formed between the rod and the bladder, a second chamber having an annular cross section for liquid being formed between the bladder and the shell, a first flow passage being formed through an end seal communicating with the first chamber, a second flow passage being formed though an end seal communicating with the second chamber.

2. A hydraulic accumulator as in claim 1, wherein the shell is constructed of filament windings embedded in a continuous plastic matrix.

3. A hydraulic accumulator as in claim 1, further comprising a liner positioned adjacent to the inside surface of the shell.

4. A hydraulic accumulator as in claim 1, wherein the rod has a head at the first end which forms an element of the first end seal for the shell and a threaded second end, a nut being positioned on the threaded second end forming an element of the second end seal for the shell.

5. A hydraulic accumulator as in claim 4 further comprising a first annular seal positioned between a generally cylindrical portion of the bolt head and the generally cylindrical inside surface at the first end of the shell, and a second annular seal positioned between a generally cylindrical portion of the bolt adjacent the threaded end section and a generally cylindrical inside portion of the nut, and a third annular seal positioned between a generally cylindrical outer surface of the nut and the generally cylindrical inside surface at the second end of the shell.

6. A hydraulic accumulator as in claim 5 wherein the annular seals are O-rings and the O-rings are positioned in annular grooves formed in generally cylindrical outside surfaces.

7. A hydraulic accumulator as in claim 1 wherein the shell has curved transitional sections at the ends of the frustoconical sections.

8. A hydraulic accumulator as in claim 7 further comprising a protective coating on an outer surface of the shell.

9. A hydraulic accumulator as in claim 1 further comprising annular bands securing the first and second ends of the bladder to the rod.

10. A hydraulic accumulator as in claim 1 wherein the first and second ends of the bladder are positioned in annular recesses in the rod.

* * * * *